United States Patent
Maier

(10) Patent No.: US 8,409,740 B2
(45) Date of Patent: Apr. 2, 2013

(54) REMOTE CONTROL SYSTEM

(75) Inventor: Ferdinand Maier, Obertrum am See (AT)

(73) Assignee: FM Marketing GmbH, Obertrum Am See (AT)

( * ) Notice: Subject to any disclaimer, the term of this patent is extended or adjusted under 35 U.S.C. 154(b) by 343 days.

(21) Appl. No.: 12/796,722

(22) Filed: Jun. 9, 2010

(65) Prior Publication Data
US 2010/0310914 A1  Dec. 9, 2010

(30) Foreign Application Priority Data
Jun. 9, 2009 (DE) .................... 20 2009 008 197 U

(51) Int. Cl.
*H01M 2/10* (2006.01)

(52) U.S. Cl. ............. 429/97; 429/96; 429/100; 220/230

(58) Field of Classification Search ................. None
See application file for complete search history.

(56) References Cited

U.S. PATENT DOCUMENTS

| | | | |
|---|---|---|---|
| 2,671,819 A | 7/1951 | Field | |
| 3,695,938 A * | 10/1972 | Brodie | 429/98 |
| 5,682,557 A | 10/1997 | Harada et al. | |
| 8,139,800 B2 | 3/2012 | Ho et al. | |
| 2008/0044049 A1 | 2/2008 | Ho et al. | |
| 2008/0199031 A1 | 8/2008 | Ho et al. | |
| 2009/0289063 A1 * | 11/2009 | Fullerton et al. | 220/230 |
| 2010/0124698 A1 * | 5/2010 | Wu et al. | 429/100 |
| 2010/0156350 A1 * | 6/2010 | Murayama et al. | 320/128 |

FOREIGN PATENT DOCUMENTS

KR   10-2007-0042013   *   4/2007

* cited by examiner

Primary Examiner — Ula C Ruddock
Assistant Examiner — Tony Chuo
(74) Attorney, Agent, or Firm — Senniger Powers LLP

(57) ABSTRACT

The remote control system (1) has a battery compartment, which is disposed in a housing and which is closed by means of a removable cover lid (4). The cover lid (4) is held to the housing by means of at least one permanent magnet (6, 7).

4 Claims, 3 Drawing Sheets

REMOTE CONTROL SYSTEM

REFERENCE TO RELATED APPLICATION

This application claims priority from German application 202009008197.4 filed Jun. 9, 2009, the entire disclosure of which is incorporated by reference.

FIELD OF THE INVENTION

The invention concerns a remote control system and, in particular, a remote control system for multi-media devices.

BACKGROUND OF THE INVENTION

Remote control systems are provided with batteries with electrical energy, whereby the term "battery" is understood to mean rechargeable batteries also. The remote control systems have a battery compartment, which is disposed in a housing for the purposes of receiving the batteries and which is closed by means of a removable cover lid. It is common to either screw these cover lids onto the housing or to positively attach them using connections, such as through guiding tracks, catch hooks, or such like with the housing so that the cover lid securely closes the battery compartment during normal operation.

In order to exchange the batteries the cover lid must be removed, which is laborious and requires effort in the case of many remote control systems and in practice also frequently causes the cover lid to break off, which affects the longevity of the remote control system. One also observes in practice that the cover lid is not held tightly enough in the housing, so that, if the remote control system is dropped, the cover lid opens. Also in the case of the known remote control systems material fatigue occurs after prolonged use, so that slide guides or catch hooks can only fulfill their function inadequately and no longer hang on to the cover lid.

Especially in the case of remote control systems for multi-media systems, such as for example TVs, video recorders, TV-top boxes etc., which are utilized frequently, the characteristics named above diminish long-term and trouble-free usage.

SUMMARY OF THE INVENTION

It is therefore the object of the invention to improve the remote control system that was described initially in such a manner that a battery exchange is significantly facilitated, the battery cover lid fulfills its function nevertheless securely long term and wear-free and it is fitted with little effort to the outer contour of the device.

The object is met according to the characteristics provided in claim 1. Preferred embodiments and further developments of the invention can be gleaned from the sub claims.

According to the invention the cover lid is held by means of magnetic force at the housing. For this purpose at least one permanent magnet is provided that is preferably disposed within the housing and a ferromagnetic counterpart that is preferably disposed in the cover lid. As a result no guide ways or catch hooks that require mechanical effort have to be installed on the housing and the cover lid, which additionally provides a significant simplification and therefore saving in tooling costs in the case of the housing and the cover lid that are typically injection-molded from plastic. The utilized permanent magnets demonstrate no signs of fatigue, so that even after a prolonged time adequate holding forces are available. The removal and re-attachment of the cover lid is significantly simplified. No certain movements in certain directions have to be executed. Rather the cover lid can simply be lifted off or, by means of sliding in the plane of the cover lid, be taken off. The re-attachment of the cover lid is also simplified since it aligns itself by means of the magnet(s) automatically in the "correct" position and the awkward handling of often very small guidance tracks is dispensed with. Furthermore the closing of the cover lid is distinctly audible. As a result it can no longer occur that the cover lid does not properly "snap in" and falls out during later usage. Altogether the "operation" is therefore significantly simplified and can be intuitively easily grasped.

BRIEF DESCRIPTION OF THE DRAWINGS

In what follows the invention is explained in more detail based on the embodiment examples in connection with the drawing. The drawings show.

DETAILED DESCRIPTION OF PREFERRED EMBODIMENT EXAMPLES

Figures 1, 2:
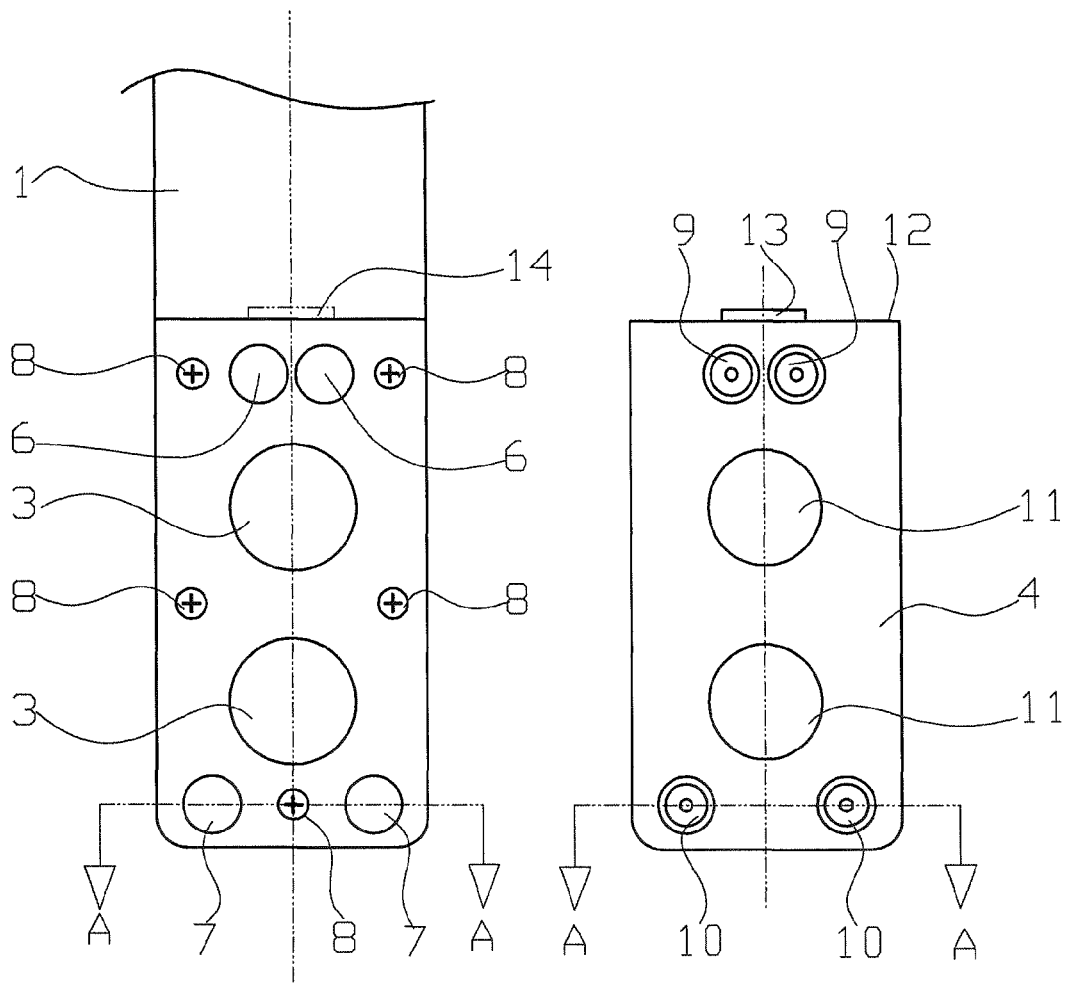
FIG. 1 a plan view onto a part of a remote control system with removed cover lid.
FIG. 2 a plan view onto the interior of a removed cover lid.

In FIG. 1 an electronic remote control system 1 is represented partially cut-off, which features a battery compartment 2 into which one or several batteries can be inserted. In the specific case two cylindrical hollow spaces 3 are provided for the reception of so-called button cells. The battery compartment 2 can be closed by means of a cover lid 4. The cover lid 4 for the most part has the shape of a rectangular flat plate that is placed on the battery compartment.

In the represented embodiment example several permanent magnets 6 and 7 are disposed in the housing of the remote control system in the area of the battery compartment 2, said magnets are pressed into a carrier plate 5 whereby the carrier plate 5 is secured to the housing by means of several screws 8.

Figure 3:
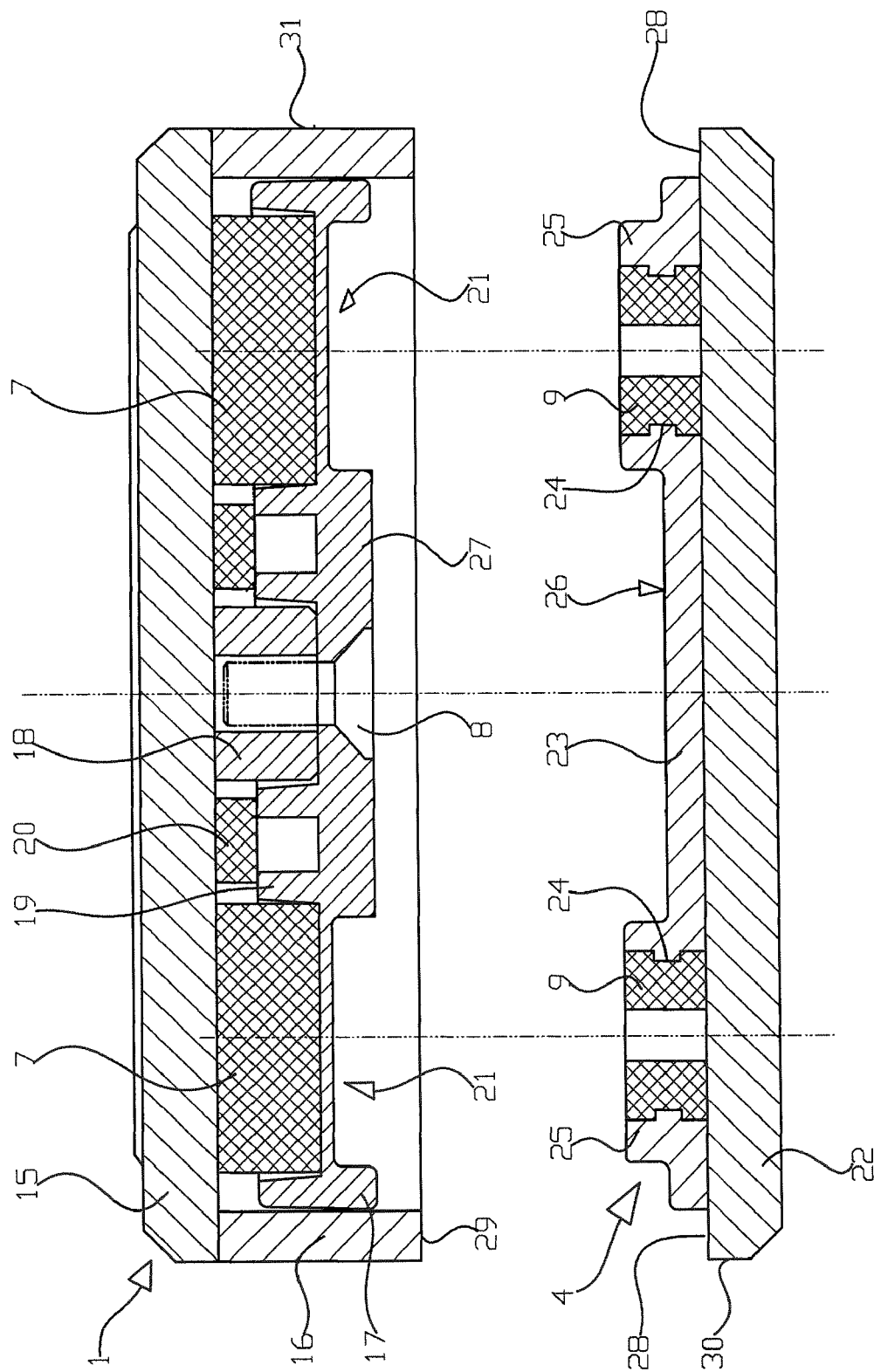
FIG. 3 a cross section of a remote control system and a cover lid along the line A-A of the FIGS. 1 and 2 with removed cover lid.
Figure 4:
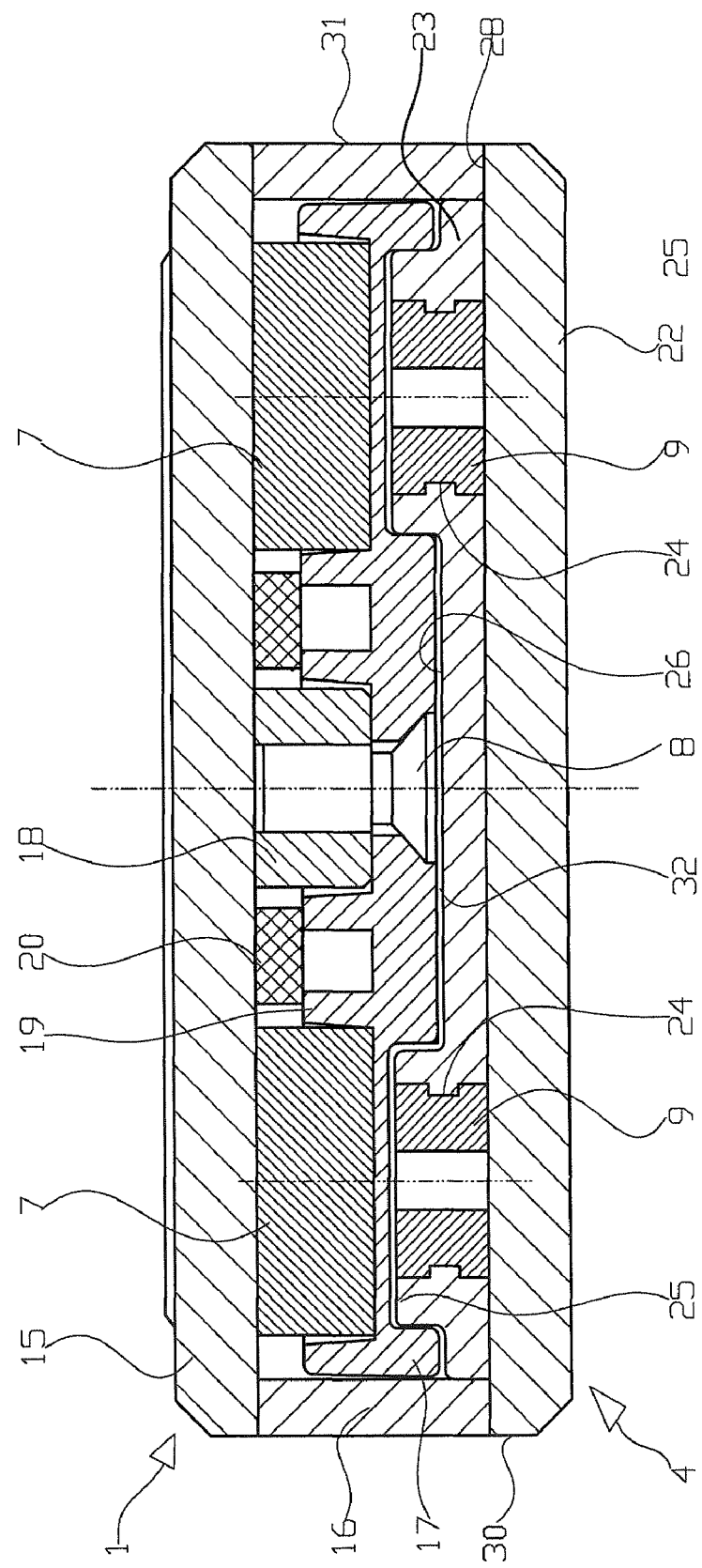
FIG. 4 a cross section of a remote control system with attached cover lid.

On the cover lid 4, facing the permanent magnets 6 and 7, ferromagnetic counterparts 9 and 10 are disposed that, as will be explained in the context of the FIGS. 3 and 4, are injected into the housing lid. Furthermore one can recognize in FIG. 2 that on the cover lid 4 recesses 11 are provided into which the batteries can protrude partially. This characteristic is however optional and depends on the design height of the remote control system and the batteries.

Likewise optional on the face side 12 of the cover lid 4 a centering projection 13 may be provided which engages a centering recess 14 of the housing 1.

FIG. 3 shows a cut through the housing of the remote control system 1 and the cover lid 4 respectively along the line A-A of FIGS. 1 and 2, whereby the cover lid 4 is still raised relative to the housing of the remote control system 1. The housing of the remote control system 1 features a front plate 15 that is attached to the housing frame 16. On the front plate the usual keys for operation (not represented) are disposed or the front plate is implemented as a so-called touch screen (tough-sensitive viewing screen). On the front plate 15 and the housing frame 16 is a battery receptacle 17 attached that is implemented as a plastic injection molding piece and held to a housing part 18 by means of the screw 8. The permanent magnets 7 are pressed into the battery receptacle 17 and held between the interior side of the front plate 15 and a side of the battery receptacle 17 that points to the front plate 15.

Surrounding the area of the screw 8 the battery receptacle 17 features, in the direction toward the front plate 15, a protruding edge 19 that abuts to an elastic ring 20 that itself is braced against the interior side of the front plate 17 so that the battery receptacle 17 and therefore also the magnets 7 are held in place elastically relative to the housing of the remote control system 1 in order to avoid mechanical tensions and to dampen mechanical shocks, which is particularly then of importance when the front plate 15 is made of glass.

The battery receptacle 17 features recesses 21 in the area of the magnets 7 which the magnetic counter parts 9 can engage, whereby also a positive centering of the cover lid 4 is implemented.

The cover lid 4 consists of a flat cover plate 22 and a carrier part 23 that is connected with it, whereby the connection is implemented for example through adhesive bonding. The ferromagnetic counter parts 9 are injected into the carrier part 23, which consists of plastic. The ferromagnetic counter parts 9 are in this case implemented as a metal disk or metal ring of ferromagnetic material that feature on their outer circumference a radial groove 24 by means of which, during the plastic injection, a firm anchoring of the ferromagnetic counter parts 9 is achieved.

Surrounding the ferromagnetic counter parts 9 the carrier part 23 features a cylindrical protrusion 25 that is adapted to the recess 21 of the battery receptacle 17. As a result the carrier part 23 features a centered recess 26 which again is adapted to a protrusion 27 of the battery receptacle 17. The corresponding protrusions and recesses engage one another during the placing of the cover lid 4 so that a positive centering is assured.

This can be better recognized from FIG. 4 in which case the cover lid 4 is in place. From there it can be recognized that the individual parts engage one another and that the magnets 7 and the ferromagnetic counter parts 9 are positioned exactly oppositely one another so that the cover lid 4 is held to the device 1 by means of magnetic force.

The protrusions 25 and 27 and the associated recesses 21 and 26 are—as can be recognized from FIG. 4—dimensioned such that an edge 28 of the cover lid 22 comes in contact with a face side 29 of the frame 16, and the outer side 30 of the cover plate 22 is thereby aligned flush with the outer side 31 of the frame 16 so that no noticeable edge is present there. A small gap 32 can therefore be present between the surfaces of the battery receptacle 17 that face one another in the assembled state in order to assure a flush abutment of the edge 28 against the face side 29 of the frame 16.

In the represented embodiment example a total of four magnets and four magnetic counter parts are shown that are pair wise arranged close to the ends of the battery compartment. The magnetic counter parts 9 and 10 are also represented as ring disks. To the person skilled in the arts it is clear that a different arrangement and number of magnets and a different corresponding number and shape of magnetic counter parts are also possible. If the cover lid 4 features the centering protrusion 13 represented in FIG. 2 and the housing of the remote control system 1 features the centering recess 14 represented in FIG. 1, it can also be sufficient to attach, only on the facing end of the cover lid 4, one or two magnets corresponding to the magnet 7 and corresponding to the magnetic counter parts 10. Furthermore it is clear that the represented hollow spaces 3 feature, depending on the type of batteries used, the corresponding shape so that also the common elongated batteries can be utilized.

The invention claimed is:

1. A battery-powered remote control system comprising:
a housing,
a battery compartment disposed in the housing, and
a removable cover lid that closes the battery compartment, wherein the cover lid is held in place by at least one permanent magnet on the housing of the remote control system;
at least one ferromagnetic counterpart which is a metal disk or a metal ring that is positively anchored by injection in a carrier part and features on its outer circumference a radial groove, whereby the carrier part is attached to a flat cover plate; and
a battery receptacle comprising a recess in the area of the at least one magnet;
wherein the cover lid features, in the area of the associated ferromagnetic counterpart, a protrusion surrounding the at least one ferromagnetic counterpart, which protrusion is adapted to positively engage with said recess of the battery receptacle;
wherein in the assembled state, a gap is present between the battery receptacle and the carrier part to assure that an edge of the cover plate is in contact with a face side of a frame of the housing; and
wherein in the assembled state, an outer side of the cover plate is flush with an outer side of the frame.

2. The remote control system according to claim 1, wherein the at least one permanent magnet is attached in the housing of the remote control system and at least one ferromagnetic counter part that is associated with the permanent magnet is attached to the cover lid.

3. The remote control system according to claim 1 wherein the at least one permanent magnet is pressed into a battery receptacle and that the battery receptacle is attached to the housing of the remote control system.

4. The remote control system according to claim 1, wherein the battery receptacle is supported elastically relative to the housing of the remote control system.

* * * * *